United States Patent [19]

Nakayama

[11] Patent Number: 4,899,302
[45] Date of Patent: Feb. 6, 1990

[54] ARITHMETIC UNIT FOR INVERSE TRIGONOMETRIC FUNCTION

[75] Inventor: Misayo Nakayama, Tokyo, Japan

[73] Assignee: NEC Corporation, Tokyo, Japan

[21] Appl. No.: 311,168

[22] Filed: Feb. 15, 1989

[30] Foreign Application Priority Data

Feb. 17, 1988 [JP] Japan .................................. 63-35901

[51] Int. Cl.⁴ .......................................... G06F 15/347
[52] U.S. Cl. .................................................... 364/729
[58] Field of Search ............................... 364/729, 730

[56] References Cited

U.S. PATENT DOCUMENTS 3,956,623 5/1976 Clark et al. .......................... 364/729
4,164,022 8/1979 Rattiingourd et al. ............. 364/729

FOREIGN PATENT DOCUMENTS 54-104249 8/1979 Japan .................................. 364/729

*Primary Examiner*—David L. Clark
*Assistant Examiner*—Tan V. Mai
*Attorney, Agent, or Firm*—Helfgott & Karas

[57] ABSTRACT

An arithmetic unit carries out sequentially arithmetic pseudo division and reverse-sequentially arithmetic pseudo multiplication according to algolithm based on CORDIC method utilizing constant values $2^k \times \arctan(2^{-k})$ so as to calculate value of inverse trigonometric function $\arctan y/x$. A generater sequentially generates constant values $2^k \times \arctan(2^{-k})$ from $k=m-1$ to $k=0$ where $k=0, 1, \ldots, m-1$. A first register is operable during the pseudo division for storing a first variable and operable during the pseudo multiplication for storing a destined variable. A second register is operable during the pseudo division for storing a second variable. A barrel shifter right-shifts the value of second variable by a given shaft bit count $2k$ where $k=1, 2, \ldots, m-2, m-1, m$. A first adder-subtracter operates during the psuedo division for selectively adding or subtracting the right-shifted value of second variable to or from the value of first variable to output the result into the first register to thereby update the value of first variable, and operates during the pseudo multiplication for selectively adding or subtracting the constant value of generator to or from the value of destined variable stored in the first register to output the result into the first register to thereby update the value of destined variable. A second adder-subtracter operates during the pseudo division for selectively adding or subtracting the value of first variable to or from the value of second variable to output the result into the second register to thereby update the value of second variable. An m-stage stacker operates to process a sign bit of the second variable in First-In, Last-Out basis for controlling the first and second adder-subtracters to selectively carry out adding or subtracting operation.

5 Claims, 4 Drawing Sheets

ARITHMETIC UNIT FOR INVERSE TRIGONOMETRIC FUNCTION

BACKGROUND OF THE INVENTION

The present invention relates to an arithmetic unit for inverse trigonometric function utilized in a computer.

Calculation of the inverse trigonometric function is one of the necessary features for computers of the type carrying out scientific and technological computation. The calculation methods of the inverse trigonometric function include a method utilizing Taylor series expansion:

$$\arctan x = x - x^3/3 + x^5/5 - x^7/7 \quad (1)$$

and a method according to meromorphic function approximation using continued fraction expansion or Tchebycheff series expansion. However, these methods have drawbacks that they need a relatively long calculation time due to frequent repetition of multiplication and division and they do not provide a sufficient calculation precision.

Further, there is another calculation method for inverse trigonometric function of Cordinate Rotational Digital Computer (hereinafter, referred to as "CORDIC") which is suitable for micro-program-controlled computer. Since the CORDIC method can be carried out by adding operation, subtracting operation and right-shifting operation, this method is efficient for use in computers which have no fast multiplier unit.

Arithmetic principle of the CORDIC method is explained hereinafter for calculating an inverse trigonometric function $\theta = \arctan(y/x)$ according to binary notation with the precision of n bits. In this method, the angle value $\theta$ is represented as follows by using constants $\gamma_k$ and a series $\{a_k\}$:

$$\theta = a_0 \times \gamma_0 + a_1 \times \gamma_1 + a_2 \times \gamma_2 + \ldots + a_{n-1} \times \gamma_{n-1} + \epsilon \quad (2)$$

where, $$\gamma_k = \arctan(2^{-k}) \quad (3)$$

$$a_k = \{+1, -1\} \quad (4)$$

In this method, determination of the series $\{a_k\}$ from the input values x and y is called pseudo division, and determination of the angle value $\theta$ from the series $\{a_k\}$ is called pseudo multiplication.

In order to determine the series $\{a_k\}$, the input value x is expressed by $x = R \times \cos\theta$ and the input value y is expressed by $Y = R \times \sin\theta$ where $R = x^2 + y^2$, and the addition theorem is applied.

If $\cos(\phi_k) \geq 0$, $$a_k = +1 \quad (5)$$

$$\phi_{k+1} = \phi_k + \gamma_k \quad (6)$$

$$\cos(\phi_{k+1}) = R'_k(\cos\phi_k - 2^{-k} \times \sin\phi_k) \quad (7)$$

$$\sin(\phi_{k+1}) = R'_k(\sin\phi_k + 2^{-k} \times \cos\phi_k) \quad (8)$$

If $\cos(\phi_k) < 0$, $$a_k = -1 \quad (9)$$

$$\phi_{k+1} = \phi_k - \phi_k \quad (10)$$

$$\cos(\phi_{k+1}) = R'_k(\cos\phi_k + 2^{-k} \times \sin\phi_k) \quad (11)$$

$$\sin(\phi_{k+1}) = R'_k(\sin\phi_K - 2^{-k} \times \cos\phi_k) \quad (12)$$

where $$R'_k = 1/R_k \quad (13)$$

By repeatedly carrying out the above-described arithmetic steps for sequence number $k = 0, \ldots n-1$, the value of $\cos(\phi_K)$ approaches to zero, thereby obtaining the value of $\arctan(y/x)$. In these operation steps, the arithmetic relations (7), (8), (11) and (12) represent the pseudo division for determining the series $\{a_k\}$, and the arithmetic relations (6) and (10) represent the pseudo multiplication for determining the value $\theta$ from the series $\{a_k\}$.

The algorithm of CORDIC method applied to the above-described steps is represented as follows.

1. The arithmetic unit is set with initial values $x_o = x$, $y_o = y$ and $v_o = 0$ ($0 \leq y < x < \infty$).

2. The following step 3 is repeatedly carried out for the sequence number $k = 0, 1, 2, \ldots, n-1$.

3. If $y_k \geq 0$, $a_k$ is set to $a_k = +1$, and if $y_k < 0$, $a_k$ is set to $a_k = -1$. Then, the following calculations are carried out:

$$x_{k+1} = x_k + a_k \times 2^{-k} \times y_k \quad (14)$$

$$y_{k+1} = y_k - a_k \times 2^{-k} \times x_k \quad (15)$$

$$v_{k+1} = v_k + a_k \times \gamma_k \quad (16)$$

where $\gamma_k$ is the constant value satisfying the relation (3).

4. Lastly, the value $\theta = \arctan(y/x)$ is obtained as the final value of $v_n$.

The conventional algorithm of CORDIC method is carried out according to a flow chart shown in FIG. 4 by utilizing an arithmetic unit shown in FIG. 2 which has two barrel shifters and three adder-subtracters. Referring to FIG. 2, the conventional arithmetic unit includes three registers 211, 221 and 231 for storing the binary variables $y_k$, $x_k$ and $v_k$, respectively, two barrel shifters 213 and 223 for right-shifting the contents of registers 221 and 211 by a given shift bit count, respectively, an n-word ROM 204 for storing and outputting the constant values $\gamma_k$ defined by the relation (3), a first adder-subtracter 212 for selectively adding and subtracting the content of barrel shifter 213 to and from the content of register 211, a second adder-subtracter 222 for selectively adding and subtracting the content of barrel shifter 223 to and from the content of register 221, a third adder-subtracter for selectively adding and subtracting the content of ROM 204 to and from the content of register 231, and a counter 205 for designating the shift bit count k of the barrel shifter 213 and 223 and for designating the address number k of ROM 204.

Next, the operation of arithmetic unit shown in FIG. 2 is explained according to the algorithm of conventional CORDIC method shown in FIG. 4.

1. The registers 211, 221 and 231 are set with the initial values $y_o = y$, $x_o = x$ and $v_o = 0$, respectively (steps 402, 401, and 403).

2. The following procedure 3 is repeated with increment of the content k of counter 205 from $k = 0$ to $k = n-1$ (step 409).

3. For the specific sequence number k, the register 211 is stored with the variable $y_k$ according to the relation (15), the register 221 is stored with the variable $x_k$ according to the relation (14), the register 231 is stored with the variable $v_k$ according to the relation (16), and the counter 205 stores the current sequence number k. The barrel shifter 213 operates to right-shift the content of register 221 by the shift bit count k indicated by the counter 205 to thereby multiply the content by factor $2^{-k}$, and the barrel shifter 223 operates to right-shift the content of register 211 by the shift bit count k indicated by the counter 205 to thereby multiply the content by factor $2^{-k}$.

In step 406, if the value of sign bit of the content $y_k$ stored in the register 211 is positive, the value of $a_k$ is determined to $a_k = +1$. Consequently, the adder-subtracter 212 carries out the subtracting operation to update the variable $y_{k+1} = y_k - (2^{-k})x_k$ (step 412), the adder-subtracter 222 carries out the adding operation to update the variable $x_{k+1} = X_k + (2^{-k})Y_k$ (step 411), and the adder-subtracter 232 carries out the adding operation to update the variable $v_{k+1} = v_k + \gamma_k$ (step 413).

On the other hand, if the value of sign bit of the content $y_k$ stored in the register 211 is negative, the value $a_k$ is determined to $a_k = -1$. Consequently, the adder-subtracter 212 carries out the adding operation to update the variable $Y_{k+1} = Y_k + (2^{-k})x_k$ (step 422), the adder-subtracter 222 carries out the subtracting operation to update the variable $X_{k+1} = X_k - (2^{-k})Y_k$ (step 421) and the adder-subtracter 232 carries out the subtracting operation to update the variable $v_{k+1} = v_k \gamma_k$ (step 423). The outputs of three adder-subtracters 212, 222 and 232 are stored in the corresponding registers 211, 221 and 231 as the updated variables $y_{k+1}$, $x_{k+1}$ and $v_{k+1}$, respectively.

4. After repeating the above-described procedure 3 n times from $k=0$ to $k=n-1$ (step 409), the register 231 is stored with the final variable $v_n$ which determines the value of arctan $(y/x) = v_n$ (step 410). According to the above-described operation, if the procedure 3 requires one clock for each time to process, the total calculating process requires about n number of clocks.

FIG. 3 shows another conventional arithmetic unit having a single barrel shifter and a single adder-subtracter for effecting the algorithm of CORDIC method.

Referring to FIG. 3, the arithmetic unit comprises three registers 308, 307 and 309 for storing three kinds of binary variables $y_k$, $x_k$ and $v_k$, respectively, a barrel shifter 303 for carring out selectively right-shifting and left-shifting of binary values by a given shift bit count, an n-word ROM 302 for generating the constant values $\gamma_k$ defined by the relation (3), and an adder-subtracter 304 for selectively adding or subtracting contents of a pair of input ports A and B thereof to each other or from each other. A counter 306 operates to control a cycle number of the CORDIC loop procedure, and another counter 301 designates the shift bit count k of the barrel shifter 303 and the address number k of the ROM 302.

Next, the operation of arithmetic unit shown in FIG. 3, is explained according to the algorithm of CORDIC method shown in FIG. 4.

1. The registers 307, 308 and 309 are set with the initial values $x_o = x$, $y_o = y$ and $v_o = 0$, respectively (steps 401, 402 and 403), the counter 301 is set with the initial sequence number $k = 0$ (step 405) and the counter 306 is set with the initial value n=number of bits (step 404).

2. The following procedure 3 is repeatedly carried out for n times with decrement of the content of counter 306 from n to 1.

3. The register 308 is stored with the current variable $y_k$ according to the relation (15), the register 307 is stored with the current variable $x_k$ according to the relation (14), the register 309 is stored with the current variable $v_k$ according to the relation (16), and the counter 301 is stored with the current sequence number k. The barrel shifter 303 operates to right-shift a binary value outputted from a data bus by the given shift bit count k indicated by the counter 301 to thereby multiply the outputted binary value by the factor $2^{-k}$.

If the sign bit of the content of register 305 indicates positive (step 306), the value of series component $a_k$ is determined to $a_k = +1$. At this stage, the content $x_k$ of register 307 is transferred to the input port A, and the content $y_k$ of register 308 is transferred to the barrel shifter 303 in which the variable $y_k$ is right-shifted with the shift bit count k indicated by the counter 301 and the right-shifted value $(2^{-k})y_k$ is transferred to the other input port B. Then the adder-subtracter 304 carries out the adding operation between the input ports A and B, and the result is transferred to the register 307 (step 411). Next, the content $y_k$ of register 308 is transferred to the input port A, and the content $x_k$ of register 307 is right-shifted by the barrel shifter 303 with the shift bit count k designated by the counter 301 and the right-shifted value is transferred to the other input port B. Then, the adder-subtracter carries out the subtracting operation between the input ports A and B and the calculated result is transferred to the register 308 (step 412). Next, the content $v_k$ of register 309 is transferred to the input port A, and the content of the ROM 303 addressed by the sequence number k which is indicated by the counter 301 is transferred to the other input port B. Then, the adder-subtracter 304 carries out the adding operation between the input ports A and B and the calculated result is transferred to the register 309 (step 413).

On the other hand, if the sign bit of the content of register 305 indicates negative, the value of series component $a_k$ is determined to $a_k = -1$. At this time, the content $x_k$ of register 307 is transferred to the input port A, and the content $y_k$ of register 308 is right-shifted by the barrel shifter 303 with the shift bit count k indicated by the counter 301 and the right-shifted value $2^{-k} \times y_k$ is transferred to the other input port B. Then the adder-subtracter 304 carries out the subtracting operation between the input ports A and B, and the result is transferred to the register 307 (step 421). Next, the content $y_k$ of register 308 is transferred to the input port A, and the content $x_k$ of register 307 is right-shifted by the barrel shifter 303 with the shift bit count k designated by the counter 301 and the right-shifted value is transferred to the other input port B. Then, the adder-subtracter 304 carries out the adding operation between the input ports A and B and the calculated result is transferred to the register 308 (step 422). Next, the content $v_k$ of register 309 is transferred to the input port A, and the content of the ROM 303 addressed by the sequence number k which is indicated by the counter 301 is transferred to the other input port B. Then, the adder-subtracter 304 carries out the subtracting operation between the input ports A and B and the calculated result is transferred to the register 309 (step 413).

4. The above-described procedure 3 is repeated n times (step 409), and thereafter the register 309 is stored with the final value $v_n = \arctan(y/x)$ (step 410).

The above-described conventional procedure is carried out by micro program. In such micro program, if the above-described procedure 3 requires α number of clocks for each time, the total calculating procedure requires n×α number of clocks and therefore a considerably long calculation time.

The forementioned two types of conventional arithmetic units for inverse trigonometric function have the following drawbacks.

With respect to the conventional unit of FIG. 2, firstly, the unit requires many hardware elements including two barrel shifters and three adder-subtracters. If the unit is incorporated into a large scale integrated circuit (LSI), since the barrel shifter occupies a large area, the total area assigned to the arithmetic unit for inverse trigonometric function becomes great. Especially in order to carry out the highly precise calculation (with multi length word), both of the barrel shifter and adder-subtracter need a larger area within the LSI. In addition, since the conventional arithmetic unit cannot be utilized for general purpose other than for calculation of the inverse trigonometric function, the cost performance is not satisfactory. Secondly, the precision of calculation result is not good. Namely, since the constant value $\gamma_k$ defined by the relation (3) becomes small in accordance with the increment of sequence number k, significant figure of the constant value $\gamma_k$ is decreased and the rounding error is accumulated about the least significant bit (LSB). Further, since calculation of the relations (7), (8), (11) and (12) is based on the algorithm with fixed point number, if the variable x, y and arctan (y/x) are represented by floating point number, the variables x and y have to be converted into the fixed point number so as to calculate the value of arctan (y/x) and then the value of arctan (y/x) of the fixed point number has to be converted into the floating point number. In such case, if the variable x or y has a very small value, the significant figures are considerably reduced through the conversion into the fixed point number.

With respect to the other conventional unit of FIG. 3, it has a drawback that the calculation time is considerably long. Since the process of CORDIC method (relating to the arithmetic relations (6), (7), (8), (10), (11) and (12)) is carried out entirely by micro program, a considerably long calculation time is needed.

SUMMARY OF THE INVENTION

An object of the present invention is, therefore, to provide a fast arithmetic unit for calculating the value of inverse trigonometric function with relatively small number of hardware components and a desired precision based on a modified CORDIC method. According to the present invention, the new arithmetic unit for inverse trigonometric function is comprised of a generater for generating constant values of $2^k \times \arctan(2^{-k})$ or $\arctan(2^{-k})$ (where integer number k=0, 1, ..., m−1) sequentially from k=m−1 to k=0, a first register, a second register, a single barrel shifter for right-shifting the content of second register by a shift bit count of 2k (where k=1, 2, ... m−2, m−1, m), a first adder-subtracter for adding to or subtracting from the content of first register the content of barrel shifter or the constant value generated by the generater and for outputting the thus calculated result into the first register, a second adder-subtracter for adding to or subtracting from the content of second register the content of the first register and for outputting the thus calculated result into the second register, and a stacker of the m-stage First-In Last-Out type receptive of a sign bit data from the second register for controlling the first and second adder-shifters to selectively operate the arithmetic addition or subtraction.

Hereinafter, arithmetic principle of the present invention is explained in conjunction with arithmetic relations for calculating the value of inverse trigonometric function. The inventive arithmetic principle is similar to that of the CORDIC method, and the inventive algorithm is a modification of the CORDIC algorithm. The pseudo division and pseudo multiplication are concurrently carried out in the conventional CORDIC method, whereas the pseudo division is first carried out and thereafter the pseudo multiplication is carried out according to the present invention.

In the conventional CORDIC method, since the error ε of the relation (2) is neglected and the pseudo multiplication is carried out with setting the initial value $v_o = 0$, n number of loop procedure is needed to obtain the binary n-bit precision.

On the other hand, according to the present invention, in view of the fact that since ε is smaller than $2^n$ according to the relation (2), if the calculation is carried out with binary 2n-digit of precision, arctan ε is approximately equal to ε according to the relation (1), the pseudo multiplication is carried out with setting this value for initialization. For this reason, the total number of steps needed for the pseudo division and multiplication is about n as in the case of the conventional CORDIC method. In order to use remainder Vm of the pseudo division as the initial set value of the pseudo multiplication with good precision, the pseudo division is carried out with shifting $Y_k$ to lower order side by one bit each step. Further, the pseudo multiplication is carried out by reverse sequence with shifting $V_k$ to upper order side by one bit each step.

In modifying the conventional algorithm of CORDIC method, the arithmetic relations (14) and (15) are transformed into the following relations (18) and (19) according to conversion expressed by the following relation (17):

$$X_k = x_k, \quad Y_k = 2^k \times y_k \tag{17}$$

$$X_{k+1} = X_k + a_k \times 2^{-2k} \times Y_k \tag{18}$$

$$Y_{k+1} = 2(Y_k - a_k \times X_k) \tag{19}$$

when the value of k is great, since the value of $Y_k$ is small, the reduction of significant figures can be prevented by the conversion according to the relation (17).

Further, the relation (16) is transformed into the following relation (20):

$$V_{k-1} = (V_k + a_k \times \Gamma_k)/2 \tag{20}$$

and the calculation is repeated from k=m to k=i+1 with setting the initial value of $V_m = \epsilon = Y_k/X_k$.

As described above, since arctan (y/x) ≈ y/x when x and y are floating point number and y/x << 1, the pseudo division is started from an intermediate step, and the pseudo multiplication is terminated at an intermediate step. As a result, reduction of significant bits due to bit adjustment can be prevented considerably and the performance of arithmetic unit can be improved.

Hereinafter the algorithm according to the present invention is explained. The calculated result is assumed to have the precision of binary n (=2m) digits.

1. To determine the value of arctan (y/x), the given values of variables x and y ($0 < y < x < +\infty$) are inputted into the arithmetic unit.

2. The variables i, X and Y are determined according to the relation: $y/x = 2^{-i}(Y/X)$ where $1 \leq Y/X < 2$ and i; integer number, and the initial values are set to $X_i = X$ and $Y_i = Y$.

3. The pseudo division is carried out by repeating the following step 4 for $k = i, i+1, i+2, \ldots, m-1$.

4. If $Y_k \geq 0$, $a_k$ is set to $a_k = +1$, and if $Y_k < 0$, $a_k$ is set to $a_k = -1$. Then the following calculations are carried out:

$$X_{k+1} = X_k + a_k \times 2^{-2k} \times Y_k \quad (21)$$

$$Y_{k+1} = 2 \times (Y_k - a_k \times X_k) \quad (22)$$

5. The initial value $V_m$ for the pseudo multiplication is set as follows:

$$V_m = Y_m / X_m \quad (23)$$

6. The pseudo multiplication is carried out by repeating the following step 7 for $k = m, m-1, m-2, \ldots, i+1$.

7.

$$V_{k-1} = (V_k \times a_k \times \Gamma_k / 2) \quad (24)$$

where $$\Gamma_k = 2^k \times \arctan(2^{-k}) \quad (25)$$

8. The value of inverse trigonometric function arctan (y/x) is determined as arctan $(y/x) = V_i$.

DESCRIPTION OF THE PREFERRED EMBODIMENTS

Figure 1:
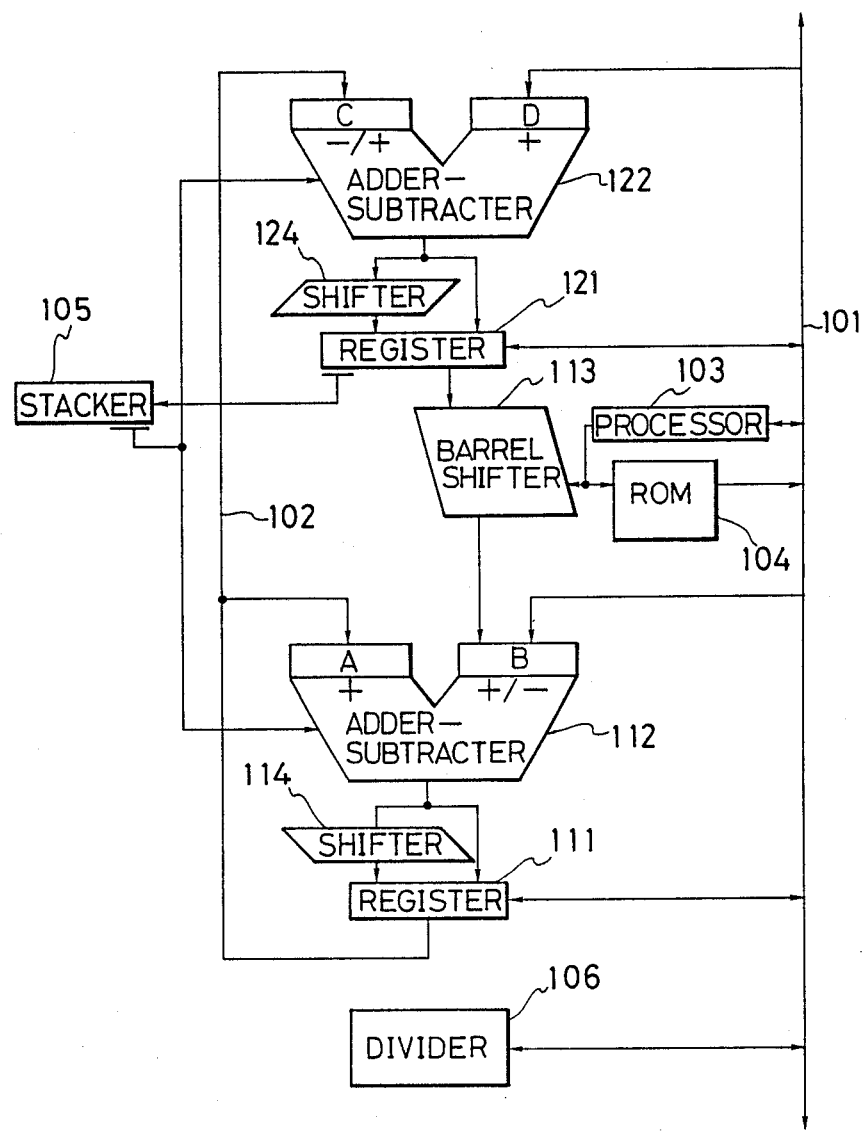
FIG. 1 is a circuit block diagram showing one embodiment of the arithmetic unit for inverse trigonometric function according to the present invention.
Figure 2:
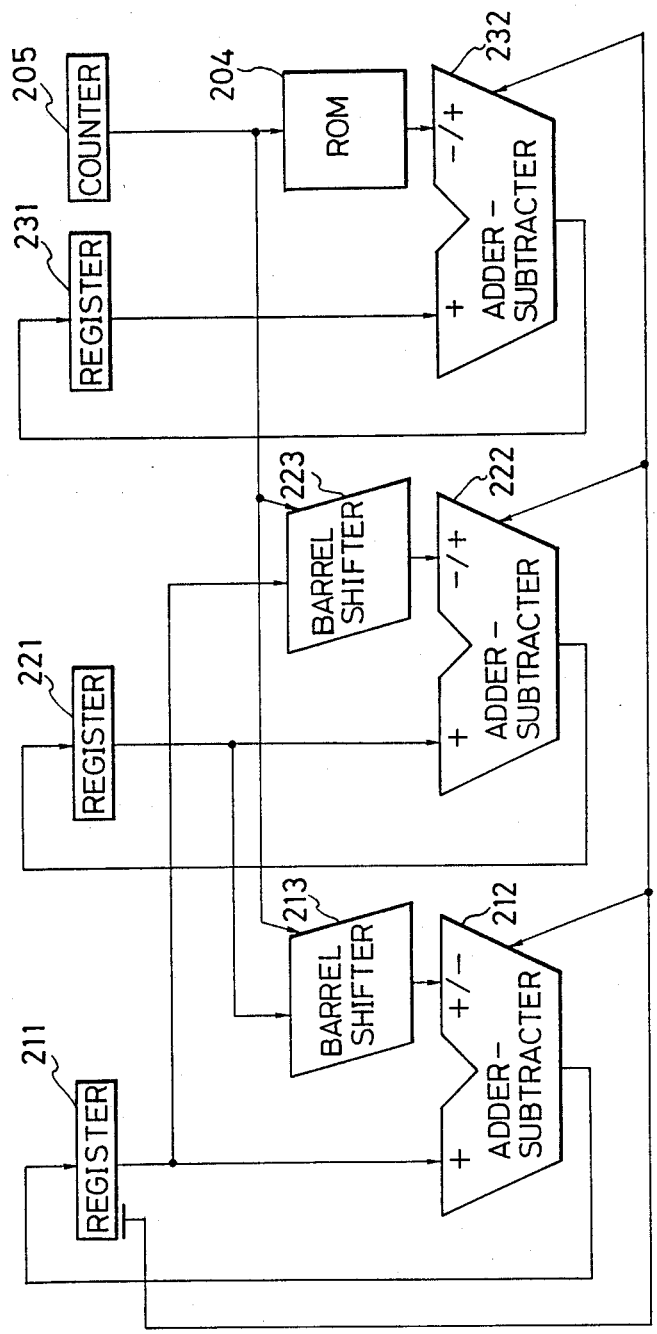
FIG. 2 is a circuit block diagram showing a conventional arithmetic unit for inverse trigonometric function.
Figure 3:
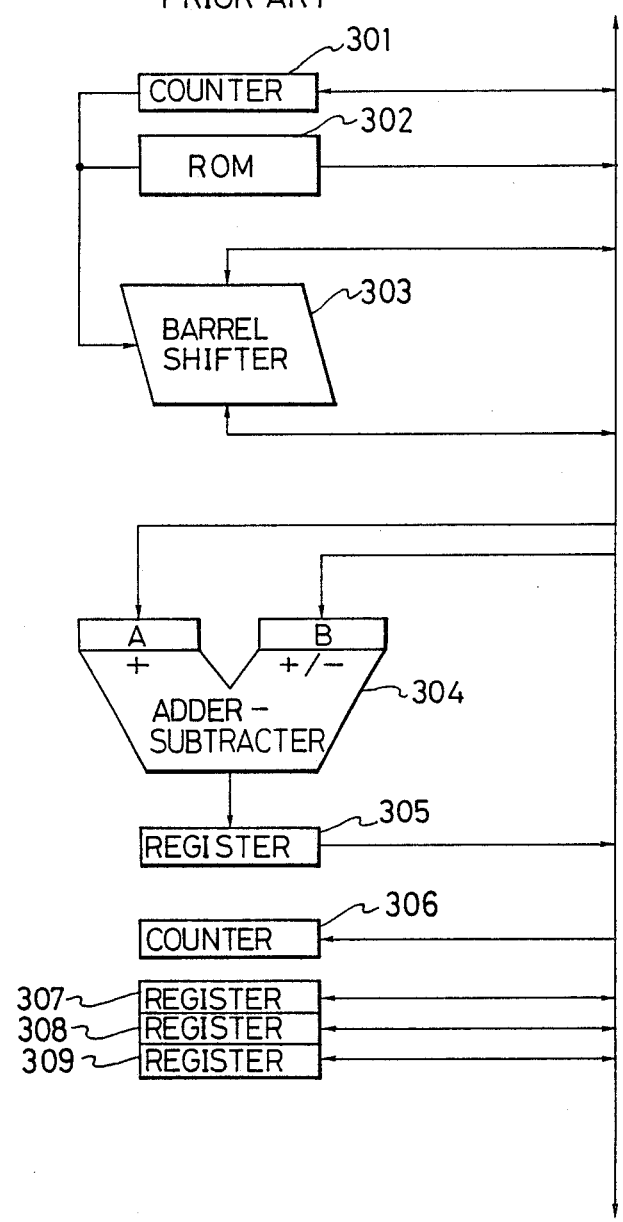
FIG. 3 is a circuit block diagram showing another conventional arithmetic unit for inverse trigonometric function.
Figure 4:
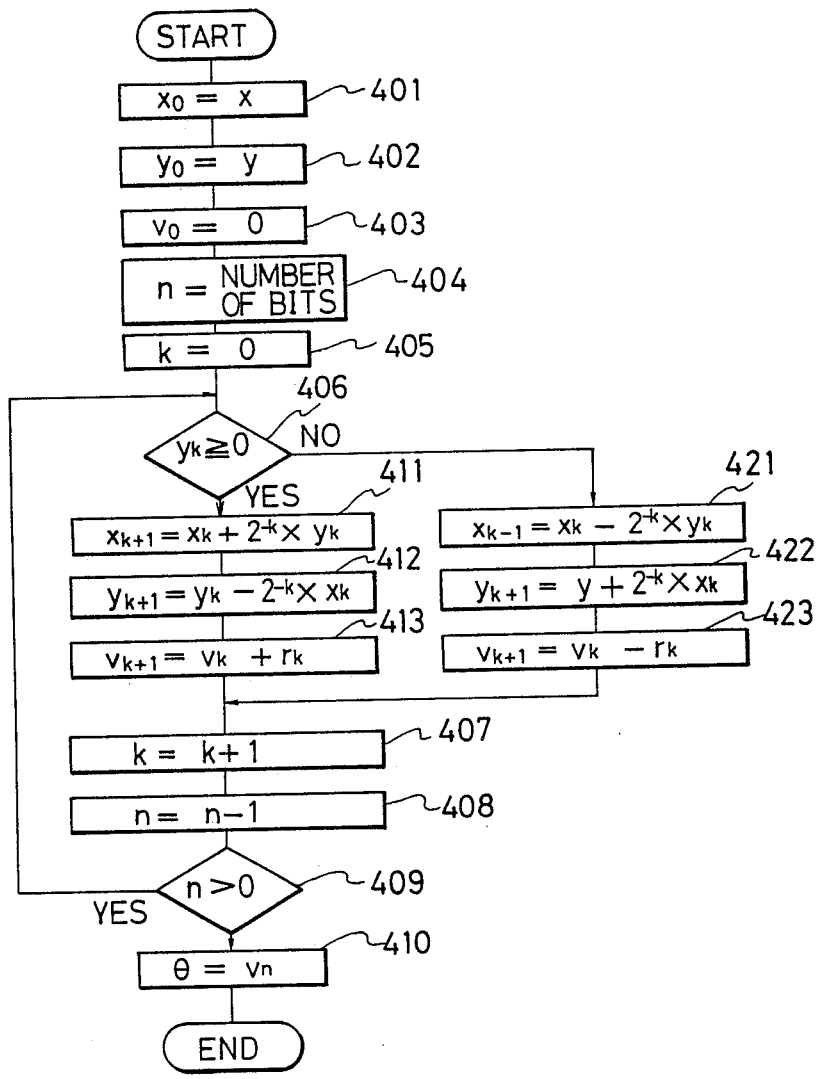
FIG. 4 is a flow chart showing the operation procedure of the conventional arithmetic units shown in FIGS. 2 and 3.

Hereinafter, embodiments of the present invention are explained in conjunction with the drawings. FIG. 1 shows a first embodiment of the arithmetic unit for calculating the value of inverse trigonometric function arctan (y/x) according to the present invention.

Referring to FIG. 1, the arithmetic unit includes a pair of first and second registers 111 and 121 for storing two kinds of variables $X_k$ and $Y_k$, respectively, a pair of first and second adder-subtracters 112 and 122 for selectively carrying out adding and subtracting operations according to the arithmetic relations (21), (22) and (24), a barrel shifter 113 for right-shifting the content of register 121 by a given shift bit count, a one-bit shifter 114 for multiplying the output of adder-subtracter 112 by the factor ½ and for outputting the result into the register 111, and another one-bit shifter 124 for multiplying the output of adder-subtracter 122 by the factor 2 and for outputting the result into the register 121. A 2m-word ROM is provided to store the constant values $\Gamma_k$ defined by the relation (25), a processor 103 is provided to process the exponent part $2^i$ of inputted value Y/X so as to control the shift bit count of barrel shifter 113 and the addressing of ROM 104, a stacker 105 of the First-In, Last-Out type is provided to stack the series $\{a_k\}$ and to control the first and second adder-subtracters 112 and 122 to selectively carry out adding and subtracting operations, and a divider 106 is provided to receive divisor and divident from a bus 101 and to output the quotient into the bus 101. The bus 101 is connected to transfer input and output data and intermediate results of calculation, and another bus 102 is connected to transfer the content of register 111 to the adder-subtracters 112 and 122.

Next, the operation of arithmetic unit shown in FIG. 1 is explained according to the inventive algorithm.

1. The values of variables x and y represented in binary floating point number ($0 \leq y < x < +\infty$) are inputted into the bus 101, and the processor 103 receives the inputted values x and y and calculates the complement i of exponent part determined when the variables x and y are represented in the form of $y/x = 2^i \times (Y/X)$ ($1 \leq Y/X < 2$, i:integer number).

2. The mantissa X of inputted variable x is stored in the register 111 as the initial value $X_i = X$, and the mantissa Y of inputted variable y is stored in the register 121 as the initial value $Y_i = Y$.

3. The pseudo division is carried out by repeating the following step 4 in response to increment of the sequence number k of the processor 103 in the order of $k = i, i+1, i+2, \ldots, m-1$.

4. Firstly, the value of sign bit of the current content $Y_k$ stored in the register 121 is inputted or pushed into the stacker 105 which operates in the First-In, Last-Out basis, the value corresponding to that of $a_k$.

The current content $X_k$ of the register 111 is transferred to an input port A of the adder-subtracter 112 through the bus 102 and to an input port C of the adder-subtracter 122. At the same time, the content $Y_k$ of register 121 is transferred to another input port D of the adder-subtracter 122, and concurrently the content $Y_k$ of register 121 is right-shifted by a shift bit count 2k which is twice as much as the current sequence number k of the processor 103 (which means that the content $Y_k$ is multiplied by the factor $2^{-2k}$) and the result is transferred to another input port B of the adder-subtracter 112.

Next, if the sign bit of the content $Y_k$ stored in the register 121 indicates positive, i.e., ak = +1, the adder-subtracter 112 carries out the adding operation between the output ports A and B and writes the result into the register 111 to store the update value $X_{k+1} = X_k + a_k \times 2^{-2k} \times Y_k$. On the other hand, if the sign bit of the content $Y_k$ in the register 121 indicates negative, i.e., $a_k = -1$, the adder-subtracter carries out the subtracting operation between the output ports A and B and writes the result into the register 111 to store the update value $X_{k+1} = X_k + a_k \times 2^{-2k} \times Y_k$. At the same time, if the sign bit of value $Y_k$ indicates positive, i.e., $a_k = +1$, the other adder-subtracter 122 carries out the subtracting operation between the input ports C and D and the calculated result is doubled by the shifter 124 and is written into the register 121 as the update value $Y_{k+1}=2\times(Y_k-a_k\times X_k)$. On the other hand, if the sign bit of value $Y_k$ indicates negative, i.e., $a_k=-1$, the same adder-subtracter 122 carries out the adding operation between the input ports C and D and the calculated result is doubled by the shifter 124 and is written into the register 121 as the update value $Y_{k+1}=2\times(Y_K-a_k\times X_k)$.

5. After completing the repeated step 4 from k=i to k=m−1, the final content $X_m$ stored in the register 111 and the other final content $Y_m$ stored in the other register 121 are transferred to the divider 106 through the bus 101. The divider 106 carries out the dividing calculation $V_m=Y_m/X_m$ and the quotient $V_m$ is transferred to the register 111 through the bus 101 as the initial value of distined variable.

6. The pseudo multiplication is carried out by repeating the following step 7 in response to decrement of the sequence number k of the processor 103 in the order of k=m, m−1, m−2, . . . , i+1.

7. The current content $V_k$ of register 111 is transferred to the input port A of the adder-subtracter 112 and, at the same time, the constant value $\Gamma_k$ is transferred to the other input port B of the adder-shifter 112 through the bus 101. Next, if the value popped up from the stacker 105 in the First-In, Last-Out basis indicates positive, i.e., $a_k=+1$, the adder-subtracter 112 carries out the adding operation between the input ports A and B and the result is multiplied by the factor ½ through the shifter 114 and is written into the register 111 as the update value $V_{k-1}=(V_k+a_k\times\Gamma_k)/2$. On the other hand, if the value popped up from the stacker 105 indicates negative, i.e., $a_k=-1$, the adder-subtracter 112 carries out the subtracting operation between the input ports A and B and the result is multiplied by the factor ½ through the shifter 114 and is written into the register 111 as the update value $V_{k-1}=(V_k+a_k\times\Gamma_k)/2$.

8. Finally, the mantissa part of arctan (y/x) is obtained in the register 111 as the final destined value $V_i$. The exponent art of arctan (y/x) corresponds to the exponent part i of inputted value y/x.

By such operation, the calculations in the steps 4 and 7 require one clock, respectively, and the dividing calculation in the step 5 requires α number of clocks so that the total clock number $\{2(m-i)+\alpha\}\approx(n+\alpha)$ is needed for the entire calculating operation. Namely, the inventive process requires only additional calculating time assigned to the divider as compared to the conventional CORDIC calculation.

As described above, in this embodiment, a single barrel shifter and a pair of adder-subtracters are utilized to calculate the value of arctan (y/x) for the given first and second variables x and y at high speed and with high precision. In addition, in order to determine the value of arctan Z for the given single variable Z, the initial input values can be set to y=Z and x=1.

Floating point number is processed in the fore mentioned embodiment, while fixed point number can be processed by the same hardware. In such case, the variable i should be fixed to i=0, and the algorithm is modified as follows.

1. The initial values are set to $X_i=x$ and $Y_i=y$ ($0\leq y<x<+\infty$). This means the conversion of x and y into the fixed point numbers $X_i$ and $Y_i$.

2. The variable i is set to i=0.

3–7. These procedures 3–7 are similar to the algorithm for the floating point number.

8. The value of inverse trigonometric function arctan (y/x) is obtained.

As explained above, the arithmetic unit for inverse trigonometric function according to the present invention has the following three advantages. Firstly, the amount of hardware can be reduced. Namely, the inventive unit can be comprised of a single barrel shifter and a pair of adder-subtracters. The needed number of barrel shifter and adder-subtracter are reduced, respectively, to one element smaller than the conventional arithmetic unit. On the other hand, a stacker and a divider are added to the hardware as compared to the conventional arithmetic unit. Since the stacker is composed of an m-bit shift register and the divider can be constituted by adding a simple circuit to one of the used adder-subtracters, the added portion of hardware is considerably smaller than the eliminated portion of hardware. In addition, in case that an arithmetic unit for inverse trigonometric function is designed as a arithmetic unit for floating point number for general purpose, the two barrel shifters and three adder-shifters in the conventional unit can not be used for calculation other than the trigonometric and inverse trigonometric functions, while the divider used in the first embodiment can be applicable for other calculation.

Secondly, the precision of calculated result is high. Namely, according to the inventive algorithm, since the calculation is carried out with adjusting digits to maximize the significant figure, the high precision of calculation can be achieved. In addition, when the values of x, y and arctan (y/x) are in the floating point representation, even if the values of x and y are small, the significant figure is not reduced.

Thirdly, the calculation time can be greatly reduced. According to the inventive arithmetic unit, the process of CORDIC method is carried out by means of the hardware. For this reason, the calculation time is reduced to 1/(calculation time needed for one loop procedure of the CORDIC method) as compared to the conventional arithmetic unit controlled by micro program.

What is claimed is:

1. An arithmetic unit for carrying out sequentially arithmetic pseudo division and reverse-sequentially arithmetic pseudo multiplication according to algorithm based on CORDIC method utilizing constant values $(2^k)\arctan(2^{-k})$ so as to calculate value of inverse trigonometric function arctan Y/X, the unit comprising: generating means for sequentially generating the constant values $(2^k)\arctan(2^{-k})$ from k=m−1 to k=0 where k=0, 1, . . . , m−1; a first register operable during the pseudo division for storing a first variable and operable during the pseudo multiplication for storing a destined variable; a second register operable during the pseudo division for storing a second variable; a barrel shifter for right-shifting the value of second variable by a given shift bit count $2_k$ where k=1, 2, . . . , m−2, m−1, m; a first adder-subtracter operative during the pseudo division for selectively adding or subtracting the right-shifted value of second variable to or from the value of first variable to output the result into the first register to thereby update the value of first variable, and operative during the pseudo multiplication for selectively adding or subtracting the constant value of generating means to or from the value of destined variable stored in the first register to output the result into the first register to thereby update the value of destined variable; a second adder-subtracter operative during the pseudo division for selectively adding or subtracting the value of first variable to or from the value of second variable to output the result into the second register to thereby update the value of second variable; and m-stage stack means operative to process a sign bit of the second variable in First-In, Last-Out basis for controlling the first and second adder-subtracters to selectively carry out adding or subtracting operation.

2. An arithmetic unit as claimed in claim 1; including a divider for dividing the final value of second variable by the final value of first variable and outputting the result into the first register to thereby initialize the value of destined variable.

3. An arithmetic unit as claimed in claim 1; including a one-bit shifter operative during the pseudo multiplication for multiplying the result from the first adder-subtracter by factor ½ to output the multiplied result into the first register to thereby update the value of destined variable.

4. An arithmetic unit as claimed in claim 1; including another one-bit shifter for multiplying the result from the second adder-subtracter by factor 2 to output the multiplied result into the second register to thereby update the value of second variable.

5. An arithmetic unit as claimed in claim 1, including a processor for designating the number k of the shift bit count 2k and the constant value $(2^k)\arctan(2^{-k})$.

* * * * *